United States Patent [19]
Alvarez-Avila et al.

[11] Patent Number: 5,975,054
[45] Date of Patent: Nov. 2, 1999

[54] PROTECTIVE DEVICE AGAINST UNAUTHORIZED ACCESS

[75] Inventors: Carlos Alvarez-Avila, Freiberg; Helmut Haberer, Stuttgart, both of Germany

[73] Assignee: Robert Bosch GmbH, Stuttgart, Germany

[21] Appl. No.: 08/930,961

[22] PCT Filed: Oct. 24, 1996

[86] PCT No.: PCT/DE96/02015

§ 371 Date: Feb. 9, 1998

§ 102(e) Date: Feb. 9, 1998

[87] PCT Pub. No.: WO97/28027

PCT Pub. Date: Aug. 7, 1997

[30] Foreign Application Priority Data

Feb. 3, 1996 [DE] Germany ............................ 196 03 913

[51] Int. Cl.$^6$ .................................................. F02B 77/00
[52] U.S. Cl. ................ 123/466; 123/198 B; 123/198 E; 411/910; 70/417
[58] Field of Search .................... 123/367, 466, 123/198 B, 198 E; 411/910; 70/417, 242, 243, 244, 175

[56] References Cited

U.S. PATENT DOCUMENTS

| 4,062,336 | 12/1977 | Gant et al. | 123/506 |
| 4,209,000 | 6/1980 | Ivie | 123/466 |
| 4,353,336 | 10/1982 | Mowbray | 123/466 |
| 4,718,828 | 1/1988 | Breeck et al. | 123/198 E |

*Primary Examiner*—Thomas N. Moulis
*Attorney, Agent, or Firm*—Edward E. Greigg; Ronald E. Greigg

[57] ABSTRACT

A security system, which prevents unauthorized access to an adjusting or function element of a fuel supply pump. To that end, the security device comprises a base part, having a bottom by way of which the base part is screwed to a housing wall of the fuel supply pump, and a cap part which is placed, surrounding the function element, on the base part in such a way that the cap part has a side wall that is surrounded with positive complementary engagement by a side wall of the base part. This prevents access to the function element and to the fastening of the base part. The cap part is secured to the base part by connections that are secured against access.

20 Claims, 2 Drawing Sheets

PROTECTIVE DEVICE AGAINST UNAUTHORIZED ACCESS

PRIOR ART

The invention is based on a security system for a fuel system to protect against unauthorized use. In one such arrangement, known from European Patent Disclosure EP-A1-0 629 532, a simple cap is provided, which includes an electric circuit that surrounds a magnet valve on a fuel pump. The cap and the screw connection that connects it to the fuel pump are arranged such that the screw connection is no longer accessible once the injection pump is installed. Not until the pump is removed can the cap be unscrewed and access to the magnet valve afforded. Such magnet valves in fuel pumps serve to prevent the delivery of fuel to the pump work chambers of the fuel pump when the internal combustion engine is stopped or turned off. Before the engine is turned on, such a magnet valve has to be opened. This is done by means of an electric control unit, part of which, in the known version, is located inside the cover.

If someone without authorization seeks to start the engine, this could be accomplished by manipulation of the magnet valve. However, that can be done only if the magnet valve is also accessible. The electrical circuit located under the cover prevents easy manipulation of the magnet valve from outside the cover. Via a security code and other security provisions, electrical access to the magnet valve is prevented. Mechanical access, however, could still render the magnet valve nonfunctional and in principle could put it in the open position. Hence someone would be able to steal the vehicle to which the engine belongs.

The known security system is intended to prevent this by means of the cover provided. However, that cover is embodied simply as a sheet-metal part which nevertheless can be opened by force using levers or cutting tools. In that case, once again, direct access to the magnet valve would be possible.

ADVANTAGES OF THE INVENTION

The security system according to the invention has the advantage over the prior art that releasing the connection between the cap part and the base part is fundamentally prevented. Because the cap part covers the base part in such a way that access to its fastening to the housing of the fuel pump is possible only by removing the cap part, a high level of security is assured. The embodiment of the side walls extending complementary to one another and their positive engagement with one another prevent the possibility of removing the cap part by force using tools, at least within a prescribed minimum length of time. Within the context of a specified time period, the security system can thus not be destroyed enough to allow access to the adjusting element or the function element, which by way of example may be a magnet valve. This security is especially increased by the embodiment defined herein, in which an especially close fit between the base part acting as a holder and the cap part can be attained. By another embodiment defined herein, the security system is embodied in such a way that it presents considerable resistance to chip-removing and cutting tools. The austenitic manganese steel is extremely difficult to machine in a chip-producing way and moreover is highly impact-resistant. In an advantageous further feature, the cap comprises cast steel, so that once again there are no easily-notched edges to reduce the strengths particularly of the cap part. It is especially advantageous, in accordance with another embodiment, that the side wall of the cap part is surrounded on the outside by the side wall of the base part. Thus, the cap part presents no substantial engagement faces, especially on its face end, that would allow lifting the cap by force. The gap between the side walls, which is minimized by the positive engagement, is not accessible to leverage-exerting tools.

In another advantageous feature, the screws that connect the cap part to the base part are embodied such that after the cap is secured by them, they cannot easily be loosened again. Because of the absence of the positive-engagement face, which would be operative in the opening direction, the screw can no longer be unscrewed because of the fundamental removal of the positive-engagement faces, access in the direction of rotation of the screw is prevented. Moreover, the connection comprises screws, which according to claim 7 are of hardened steel, so that even drilling them open is not readily possible. Advantageously, an electric security device is accommodated inside the security system and does not allow electrical access to a function element, such as a magnet valve in the case of a fuel pump, inside the chamber enclosed by the security system. In a version adapted to the given conditions of the fuel pump, it is possible according to claim 10, for the base part and cap part also to be embodied such that laterally, or in other words crosswise to the plane of the bottom of the base part on the housing, they adjoin one another closely, covering the face ends of the cap part and base part at this point, in such a way that in each case only the narrowest possible gaps with the housing are formed, which do not afford access to a leverage-exerting tool.

BRIEF DESCRIPTION OF THE DRAWINGS

An exemplary embodiment of the invention is shown in the drawing and will be described in further detail in the ensuing description.

DESCRIPTION OF THE EXEMPLARY EMBODIMENT

Figure 1:
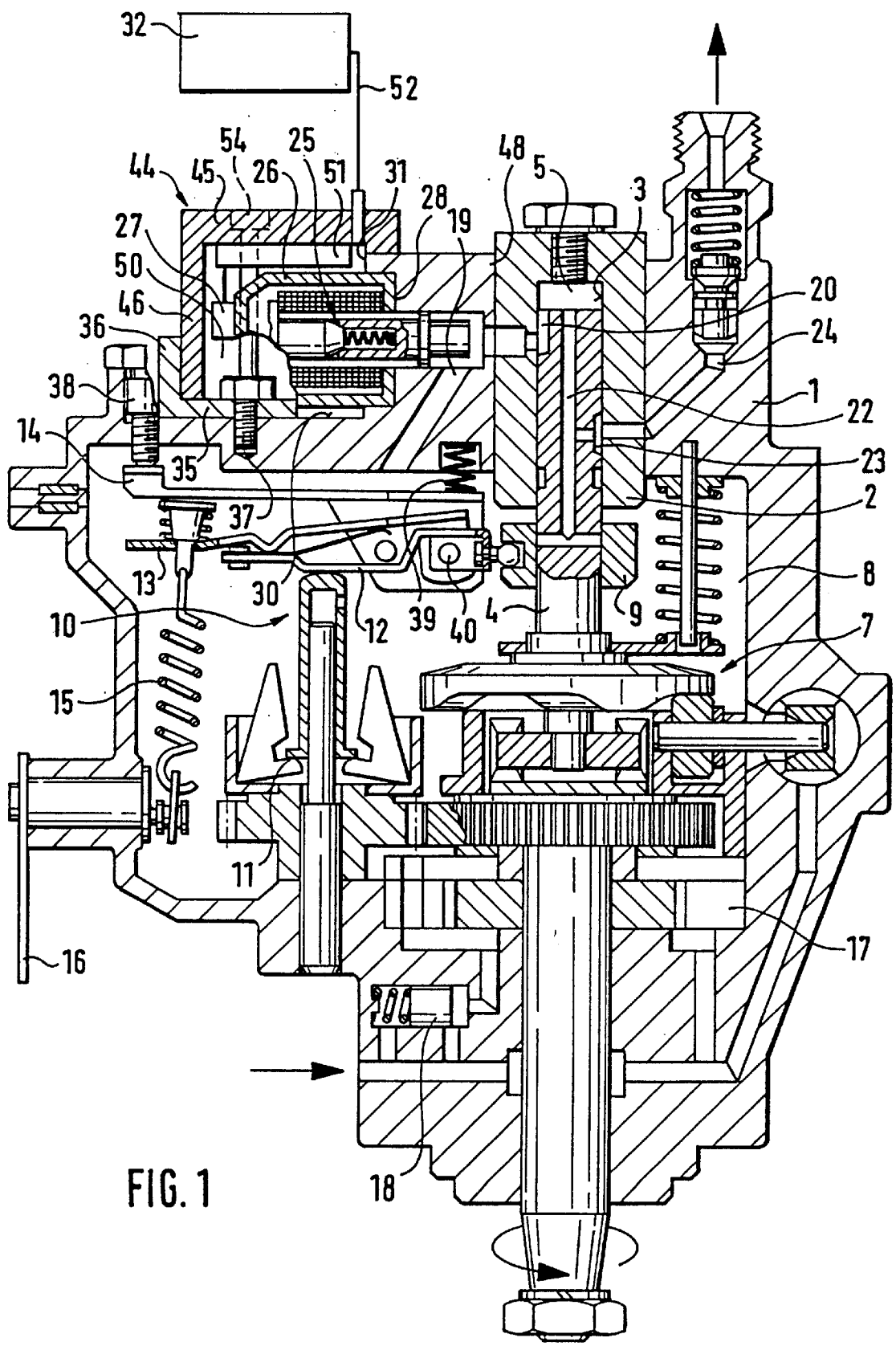
FIG. 1 shows a fuel pump with an electromagnet valve as its function element, the valve being covered by the security system, and FIG. 2, a perspective view of the base part and cap part with the associated screws for their fastening.

FIG. 1 shows a section through a distributor injection pump, having a housing 1 into which a cylinder liner 2 is inserted, which in its interior has a cylinder 3, closed on one end, in which a pump work chamber 5 is enclosed by the face end of a pumping and distributor piston 4 guided in this cylinder. The pumping and distributor piston 4 is set into a reciprocating and simultaneously rotating motion by a cam drive 7 in a known manner. Toward the cam drive, the pumping and distributor piston 4 protrudes into a pump suction chamber 8, inside which a governor slide 9 is displaceable, on the jacket face of the pumping and distributor piston, by a governor 10. The governor 10 to that end has an rpm signal transducer 11, which acts on governor levers 12 and 13, which are supported on an adjusting lever 14 and of which one is coupled to the governor slide 9 and the other is acted upon by a spring 15 counter to the force exerted by the rpm signal transducer 11. The prestressing of this governor spring 15 is adjustable from outside the injection pump in accordance with the desired torque or rpm, by means of an adjusting lever 16.

The pump work chamber 5 is supplied with fuel from the pump suction chamber 8, and this fuel in turn is brought to an rpm-dependent pressure by a fuel feed pump 17 in combination with a pressure control valve 18. The pump suction chamber can be made to communicate with the cylinder 3 via a suction line 19, when by means of the pumping and distributor piston 4 a corresponding suction groove 20 on the circumference of the pumping and distributor piston 4 is made to coincide with the inlet opening of the suction line 19. In this position, the pump work chamber 5 can be filled with fuel; the filling operation is interrupted in the course of the further rotation of the pump piston 4, and subsequently a high-pressure supply stroke of the pump piston 4 can be executed. In this process, the pump piston feeds fuel via a longitudinal conduit 22 and a distributor groove 23 to one of a plurality of injection lines 24, distributed on the circumference of the cylinder 3, which in turn each communicate with one fuel injection valve of the engine. The feeding from the pump work chamber is interrupted whenever a transverse bore that intersects the longitudinal conduit 22 is opened toward the pump suction chamber by the annular slide 9 in the course of the pump piston supply stroke.

For stopping the engine or preventing the high-pressure feeding, the suction line 19 can be closed by a magnet valve 25. In the exemplary embodiment shown, this magnet valve is inserted into a wall of the housing 1 that extends parallel to the axis of the pumping and distributor piston 4. The magnet valve, with its housing 26 that includes the magnet coil and the magnet core, and the electrical terminal 27 of the magnet valve protrude to the outside from the receiving bore 28 of the housing 1. Located parallel to the axis of the magnet valve is a flat face 30, which is at right angles to the wall 31 of the housing that receives the receiving bore 28.

Until now, in an unprotected embodiment, a control line has been connected to the electrical terminal 27 of the magnet valve; under the control of a control unit 32, this control line has excited the electromagnet of the magnet valve when needed and put the valve in the opening position. From that moment on, it was possible to operate the fuel pump. A Diesel engine, however, is already operable as soon as the cylinders of the engine, without having to be electrically controlled, are supplied with fuel and the engine pistons are set into motion in whatever way. Accordingly, when the magnet valve opens, such a Diesel engine could easily be started, even by unauthorized persons. They could also connect substitute electric lead to the magnet valve, or the magnet valve could be rendered nonfunctional in some other way so that the suction line 19 could no longer be closed.

Figure 2:
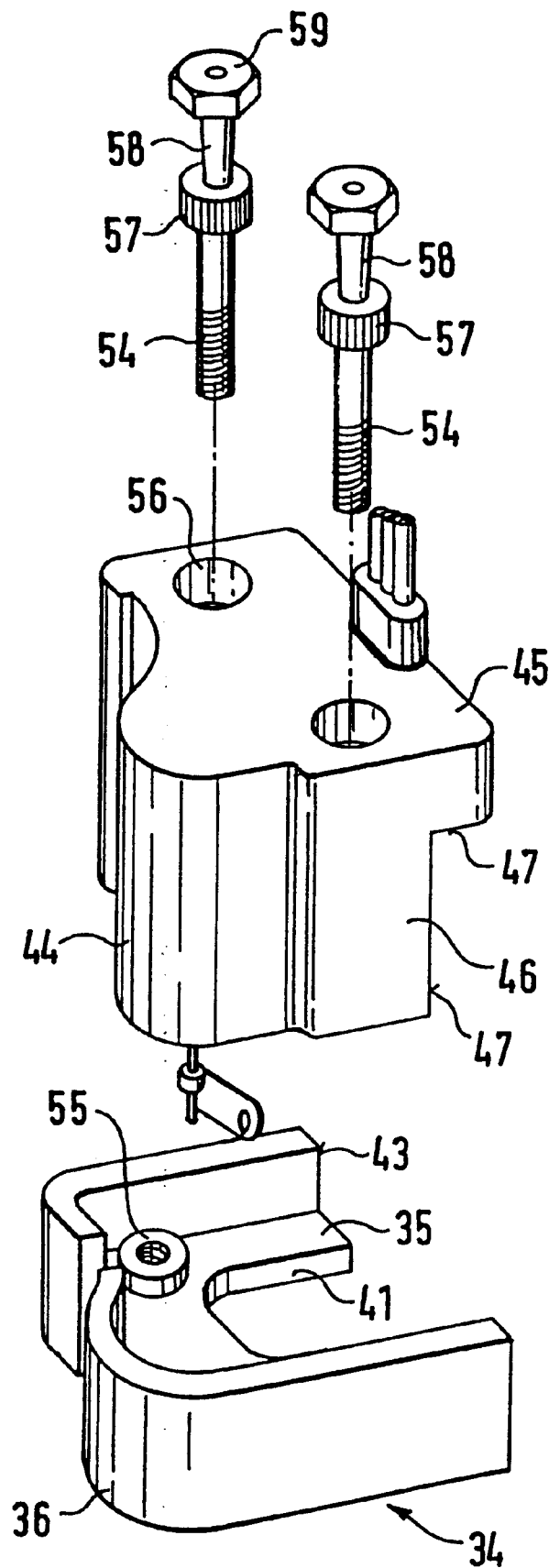

To prevent such unauthorized interventions, the access to the magnet valve 25 is now prevented according to the invention. To that end, a base part 34 of the security system is secured to the flat face. This base part comprises a bottom 35, which rests flat on the face 30, and a side wall 36 surrounding the bottom. The bottom 35 has a bore through which a fastening screw 37 can be passed that is screwed into the wall of the housing 1. In FIG. 2, the base part 34 is shown in perspective. The side wall 36 can be seen, which is shaped circumferentially in such a way that it leaves space for an adjusting screw 38 on the injection pump, with which the adjusting lever 14 of the governor can be pivoted about its axis 40, counter to the force of a restoring spring 39, in order to adjust the basic setting of the governor slide 9. The bottom, also shown, in turn has a U-shaped recess 41, which makes it possible to insert the base part 34 under the housing 26 of the magnet valve. The side wall 36 of the base part does not completely surround the bottom 35 but instead ends at a flat face end 43, which in the installed state shown in FIG. 1 comes into contact with the wall 31, in such a way that the face end is completely concealed by this wall. Thus no leverage-exerting tool can be inserted at this point between the wall 31 and the side wall 36. The bottom also rests flush on the flat face 30, so that once again it is not possible to introduce a leverage-exerting tool.

In order to cover the housing 26 of the magnet valve 25 completely, a cap part 44 is now provided, which once again has a bottom 45 and a side wall 46. This side wall is embodied as complementary to the side wall 36, in such a way that the side wall 43 is insertable in positively engaged fashion, flush, into the receptacle formed by the side wall 36 and bottom 35 of the base part 34, as shown in FIG. 1. Because of the complementary adaptation of the side walls 43 and 36, the possibility of introducing a leverage-exerting tool between the side walls is once again defended against. As with the base part 34, the side wall 43 of the cap part again surrounds the bottom incompletely and instead ends again in a flat face end 47, which in the same way comes into contact with the wall 31, or with a further wall 48 of the housing 1 adjoining it at a right angle. Thus the cap part 44 completely surrounds the magnet valve.

Inside the thus-formed closed chamber 50, an electrical security circuit 51 is disposed, preferably secured to the bottom 45 of the cap part. A supply lead 52 leads to this security circuit 51 from the control unit 32, and the security circuit 51 is also connected to the electrical terminal 27 of the magnet valve 25 in order to trigger it.

To assure the secure, non-releasable connection between the base part 34 and cap part 44, the cap part is screwed to the base part by means of screws 54. To that end, threaded cuffs 55 are provided on the bottom 35, into which cuffs the ends of the screws 54 can be screwed. The bottom of the cap part has a receiving bore 56, in which a head 57 of the screws 54 comes nonpositively into contact in the screwing-in direction. This is accomplished in a known manner by the formation of a stepped bore. The cylindrically embodied head 57 has only slight lateral play with the adjacent bore 56 and thus in the screwed-in state of the screws disappears completely inside these bores 56. The screws are screwed in via protrusions 58, which on their end have a positive-engagement face 59 in the form of the known hexagon. Via these positive-engagement faces, the screwing-in torque is applied and after that the protrusion is broken off. The head 57 of the screws has no positive-engagement faces whatever, so that after the removal of the protrusion 58 the screws can no longer readily be removed. To make intervention at this point more difficult, the screws are also made of hardened steel, so that they cannot easily be drilled open, an action that could allow them to be unscrewed by using a counterclockwise-thread drill.

To further secure against unauthorized access, the base part 34 and the cap part 44 are preferably each made of austenitic manganese steel, which is extremely difficult to machine in a chip-producing way and has high impact strength. Because of these material properties, access by violent force is made extremely difficult, so that an unauthorized person that seeks to gain access to the magnet valve by force requires considerable time to achieve success. This time is specified as the security time period for the purpose of anti-theft protection of motor vehicles. Because of the security circuit present inside the chamber 50, manipulation via the supply lead 52 and hence opening of the magnet valve by that route is not readily possible, either. Such access is guarded against by suitable codes.

The example described depends in the details of its embodiment substantially on where the magnet valve is installed. The engineering principles can be followed accordingly if the magnet valve is installed at other sites instead. For instance, if there is sufficient space available, it is possible for the cap part to be embodied as a cup-shaped part, which surrounds the protruding electromagnet on all sides and with an encompassing side wall makes a flus closure of the opening of a corresponding base part. This base part is then placed, centrally to the magnet valve, on the face end of the housing and secured there. The form of the side walls can be modified depending on the installation site, as already shown in the present example, in order to create any elements of the pump that might be present there.

The foregoing relates to preferred exemplary embodiments of the invention, it being understood that other variants and embodiments thereof are possible within the spirit and scope of the invention, the latter being defined by the appended claims.

The invention claimed and desired to be secured by Letters Patent of the United States is:

1. A security system to protect against unauthorized access to an adjusting or function element (25) of a fuel supply pump, comprising a caplike element (44) that fits over and surrounds the adjusting element or the function element and is fixed on the housing (1) of the fuel supply device, the security device comprises a base part (34) and a cap part (44), the base part has a bottom (35) and a side wall (36) circumferentially at least partly surrounding the bottom and being releasably connectable to the housing (1) by means of a connecting element (37) that penetrates the bottom (35), and the cap part being seatable on the base part (35) and having a bottom (45) that is at least partly surrounded by a side wall (46), said cap part, with its opening defined by the side wall (46) and/or by the adjacent wall (31) of the housing (1), together with the base part (34) and/or the adjacent wall (30, 31) of the housing (1), encloses a chamber (50) and is connected to the base part (34) by means of a connection (54) that is secured against access and cannot be released unless it is destroyed.

2. A security system of claim 1, in which the cap part (44) has a side wall (46) that extends in complementary fashion to the side wall (36) of the base part (34) and can be mounted on the base part with positive engagement with the side wall (36) of the base part (34).

3. A security system of claim 1, in which at least the cap part (44) comprises wear-resistant, tough austenitic manganese steel.

4. A security system of claim 2, in which at least the cap part (44) comprises wear-resistant, tough austenitic manganese steel.

5. A security system of claim 3, in which at least the cap part (44) comprises cast steel.

6. A security system of claim 4, in which at least the cap part (44) comprises cast steel.

7. A security system of claim 1, in which the side wall (46) of the cap part (44) is surrounded from outside by the side wall (36) of the base part (34).

8. A security system of claim 2, in which the side wall (46) of the cap part (44) is surrounded from outside by the side wall (36) of the base part (34).

9. A security system of claim 1, in which at least one screw, provided with a positive-engagement face effective only in a screwing-in direction is used as the connection of the cap part (44) to the base part (34).

10. A security system of claim 2, in which at least one screw, provided with a positive-engagement face effective only in a screwing-in direction is used as the connection of the cap part (44) to the base part (34).

11. A security system of claim 1, in which at least one screw (54), provided with a removable positive-engagement face (59) is used as a connection of the cap part (44) to the base part (34).

12. A security system of claim 2, in which at least one screw (54), provided with a removable positive-engagement face (59) is used as a connection of the cap part (44) to the base part (34).

13. A security system of claim 9, in which the screw comprises hardened steel.

14. A security system of claim 11, in which the screw comprises hardened steel.

15. A security system of claim 1, in which an electronic security device (51) is disposed in the chamber (50) enclosed between the base part (34) and the cap part (44) which security device is electrically connected to an electrically actuatable function element (25) and is supplied with current via a terminal (52) passed through a wall of the base part or the cap part.

16. A security system of claim 2, in which an electronic security device (51) is disposed in the chamber (50) enclosed between the base part (34) and the cap part (44) which security device is electrically connected to an electrically actuatable function element (25) and is supplied with current via a terminal (52) passed through a wall of the base part or the cap part.

17. The security system of claim 13, in which the security device (51) is secured to the inner bottom of the cap part (44).

18. The security system of claim 14, in which the security device (51) is secured to the inner bottom of the cap part (44).

19. The security system of claim 1, in which the bottom (35) of the base part (34) and the bottom (45) of the cap part (44) are each surrounded only partly by the respective side wall (36, 46), which with the circumferential face end (43, 47) of at least the cap part (44) closely adjacently borders one wall (31) of the housing (1), and the bottom (35) of the base part (34) is likewise closely adjacent to the housing face (30, 31) facing it.

20. The security system of claim 2, in which the bottom (35) of the base part (34) and the bottom (45) of the cap part (44) are each surrounded only partly by the respective side wall (36, 46), which with the circumferential face end (43, 47) of at least the cap part (44) closely adjacently borders one wall (31) of the housing (1), and the bottom (35) of the base part (34) is likewise closely adjacent to the housing face (30, 31) facing it.

* * * * *